United States Patent
Ito et al.

(10) Patent No.: US 11,215,591 B2
(45) Date of Patent: Jan. 4, 2022

(54) CHROMATOGRAPHIC DATA SYSTEM, PROCESSING APPARATUS, CHROMATOGRAPHIC DATA SYSTEM PROCESSING METHOD, AND CHROMATOGRAPH

(71) Applicant: Hitachi High-Tech Science Corporation, Tokyo (JP)

(72) Inventors: Masahito Ito, Tokyo (JP); Masato Fukuda, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 129 days.

(21) Appl. No.: 16/363,563

(22) Filed: Mar. 25, 2019

(65) Prior Publication Data

US 2019/0302070 A1 Oct. 3, 2019

(30) Foreign Application Priority Data

Mar. 29, 2018 (JP) .............................. JP2018-065651

(51) Int. Cl.
*G01N 30/88* (2006.01)
*G06F 17/18* (2006.01)
*G01N 30/86* (2006.01)

(52) U.S. Cl.
CPC ......... *G01N 30/88* (2013.01); *G01N 30/8631* (2013.01); *G01N 30/8641* (2013.01); *G06F 17/18* (2013.01); *G01N 30/8624* (2013.01); *G01N 2030/8648* (2013.01); *G01N 2030/8804* (2013.01)

(58) Field of Classification Search
None
See application file for complete search history.

(56) References Cited

U.S. PATENT DOCUMENTS

| | | | | |
|---|---|---|---|---|
| 8,682,946 B1* | 3/2014 | Hiriyannaiah | .......... | G06F 17/18 708/207 |
| 2006/0145070 A1* | 7/2006 | Hondo | ............... | G01N 30/8675 250/288 |
| 2011/0054804 A1* | 3/2011 | Pfaff | .................. | G01N 30/8637 702/25 |
| 2012/0158318 A1* | 6/2012 | Wright | .................. | B01D 59/44 702/28 |

(Continued)

FOREIGN PATENT DOCUMENTS

JP 2006-177980 A 7/2006

OTHER PUBLICATIONS

Goehner, "Background Subtract Subroutine for Spectral Data" Goehner, Anal. Chem. 50. 1223 (1978) (Year: 1978).*

*Primary Examiner* — John C Kuan
(74) *Attorney, Agent, or Firm* — Banner & Witcoff, Ltd.

(57) ABSTRACT

A chromatographic data system processing apparatus performs data processing based on plot data measured by a chromatograph. The chromatographic data system processing apparatus includes a virtual curve calculation portion which obtains a virtual curve based on the measured plot data, a tentative feature point acquisition portion which obtains a tentative feature point based on the obtained virtual curve, and an actual plot data feature point extraction portion which extracts an actual plot data feature point corresponding to the tentative feature point from the measured plot data.

9 Claims, 6 Drawing Sheets

(56) References Cited

U.S. PATENT DOCUMENTS

2015/0081250 A1\* 3/2015 Nakayama ......... G01R 13/0245
  702/189
2016/0238575 A1\* 8/2016 Kozawa ............. G01N 30/8631
2016/0238576 A1\* 8/2016 Kozawa ............. G01N 30/8641

\* cited by examiner

CHROMATOGRAPHIC DATA SYSTEM, PROCESSING APPARATUS, CHROMATOGRAPHIC DATA SYSTEM PROCESSING METHOD, AND CHROMATOGRAPH

CROSS-REFERENCE TO RELATED APPLICATION

This application claims priority from Japanese Patent Application No. 2018-065651, filed on Mar. 29, 2018, the entire subject matters of which is incorporated herein by reference.

BACKGROUND

1. Field of the Invention

The present disclosure relates to a chromatography technique such as a liquid chromatograph, and more particularly to a chromatographic data system processing apparatus, a chromatographic data system processing method, and a chromatograph.

2. Background Art

In a chromatograph, the kind and amount of components contained in an analysis sample are obtained from waveform data with time on the horizontal axis and with signal intensity on the vertical axis. In the chromatograph, feature points such as a start point where the signal intensity rises and an end point where the signal intensity falls are detected based on data detected by a device, and the waveform processing is performed. Specifically, the feature points such as the start point are found, for example, by performing curve fitting of a Gaussian function or the like using a nonlinear least squares method (for example, see JP-A-2006-177980).

In a waveform function such as the Gaussian function as described above, it is not always difficult to obtain the feature points. However, a curve obtained by the above-described waveform function is a virtual approximate curve. That is, in consideration of the influence of noise, appropriate feature points are not necessarily obtained. Generally, since an analysis operator considers that an actual data point is desired to be a feature point, feature points obtained from the virtual approximate curve are sometimes unacceptable for the analysis operator psychologically. That is, the virtual curve is a product obtained mathematically and may have doubts as to whether it is different from the actual waveform. Originally, a virtual curve based on a certain model should be allowed as long as the model is accurate, but some analysis operators cannot accept the virtual curve.

SUMMARY

An object of the present disclosure is to provide a chromatographic data system processing apparatus, a chromatographic data system processing method, and a chromatograph, which enables to obtain appropriate feature points which are acceptable for an analysis operator who emphasizes actual data points.

According to an exemplary embodiment of the present disclosure, there is provided a chromatographic data system processing apparatus that performs data processing based on plot data measured by a chromatograph, including:

a virtual curve calculation portion configured to obtain a virtual curve based on the measured plot data;

a tentative feature point acquisition portion configured to obtain a tentative feature point based on the obtained virtual curve; and an actual plot data feature point extraction portion configured to extract an actual plot data feature point corresponding to the tentative feature point from the measured plot data.

According to another exemplary embodiment of the present disclosure, there is provided a chromatograph including:

a chromatographic unit configured to separate a component contained in a sample to measure the component; and the chromatographic data system processing apparatus described above.

According to another exemplary embodiment of the present disclosure, there is provided a chromatographic data system processing method that performs data processing based on plot data measured by a chromatograph, including the steps of:

obtaining a virtual curve based on the measured plot data;

obtaining a tentative feature point based on the obtained virtual curve; and extracting an actual plot data feature point corresponding to the tentative feature point from the measured plot data.

Accordingly, the actual plot data feature point with high possibility of being a feature point or a point closest to the feature point is extracted from the actually measured plot data, so that it can be expected to obtain coordinate values of appropriate feature points.

According to the present disclosure, it is possible to obtain more appropriate feature points.

DETAILED DESCRIPTION

Hereinafter, embodiments of the present disclosure will be described in detail with reference to the drawings.

(Configuration of Liquid Chromatograph 100)

Figure 1:
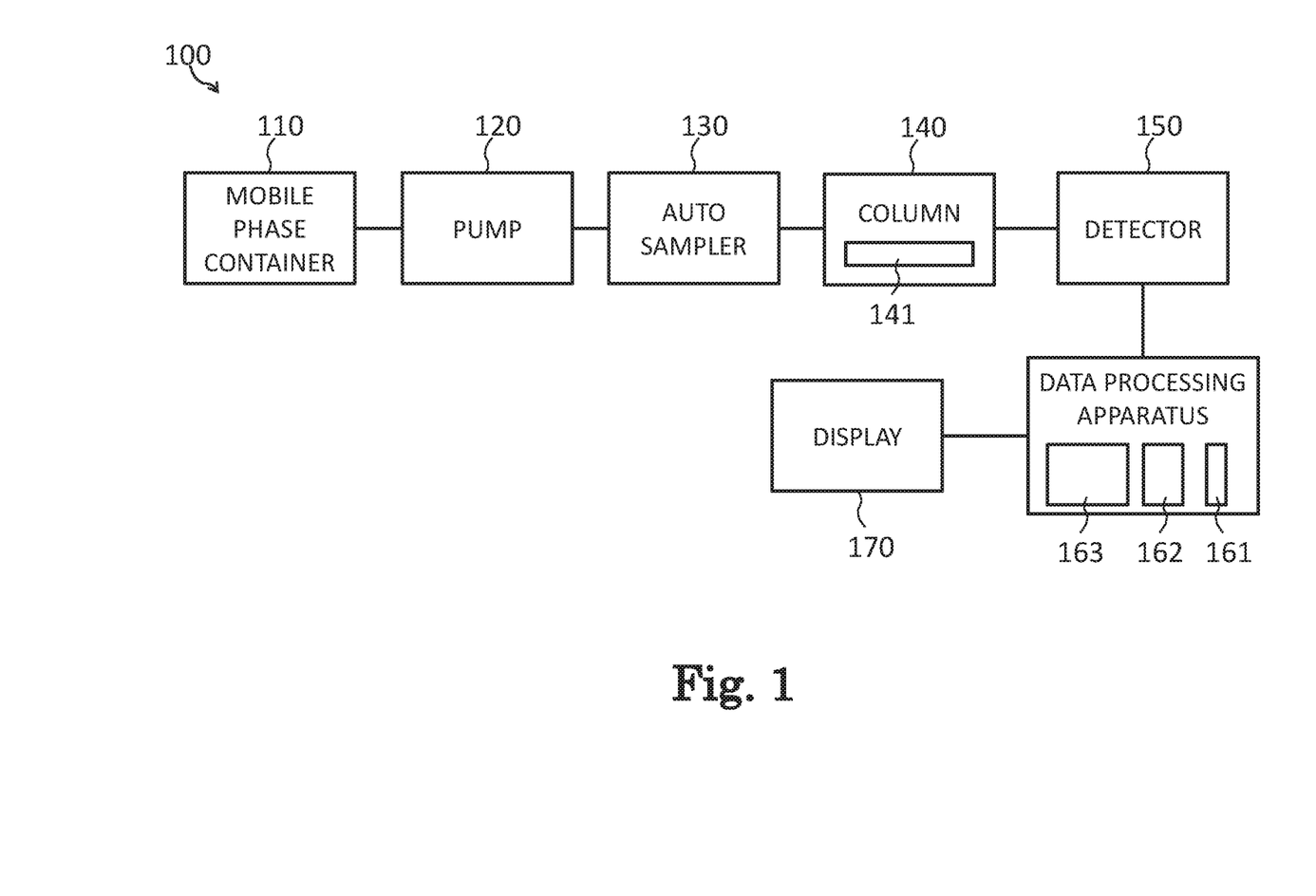
FIG. 1 is a block diagram showing a schematic configuration of a chromatograph.

FIG. 1 shows a schematic configuration of a liquid chromatograph 100. The liquid chromatograph 100 includes a mobile phase container 110 which stores a liquid as a mobile phase, a pump 120 which feeds the mobile phase, an autosampler 130 which injects a sample, a column 140 maintained at a constant temperature by a column oven 141 to separate components in the sample, a detector 150 which detects the separated components, a chromatographic data system processing apparatus (hereafter, referred to as "data processing apparatus") 160 which processes the detection result, and a display 170 which displays the processing result.

Since each element constituting the liquid chromatograph 100 can mainly be configured similarly to a general apparatus except for processing contents of the data processing apparatus 160, a detailed description thereof will be omitted.

(Detailed Configuration of Data Processing Apparatus 160)

Figure 2:
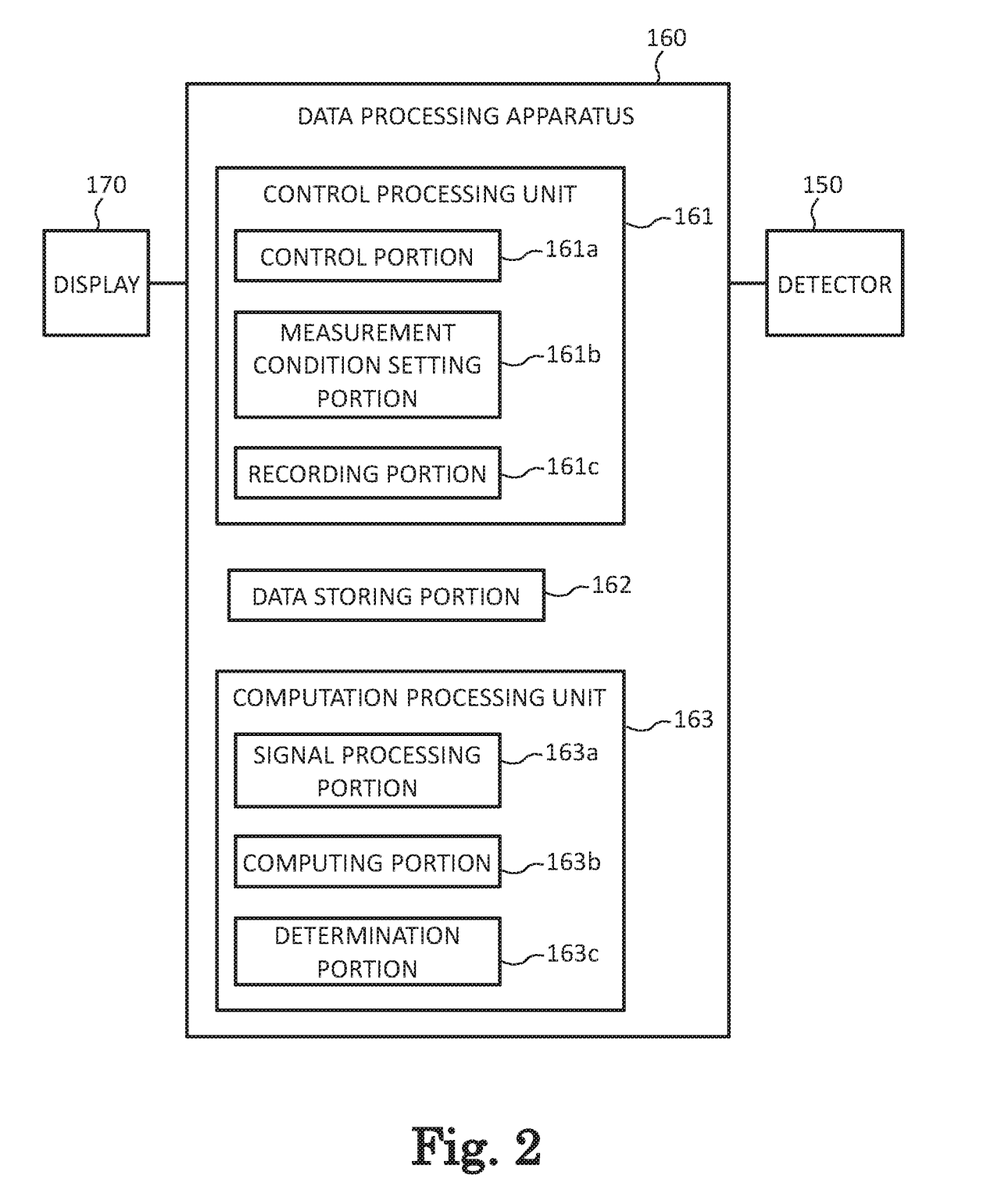
FIG. 2 is a block diagram showing a schematic configuration of a chromatographic data system processing apparatus.

As shown in FIG. 2, the data processing apparatus 160 includes a control processing unit 161, a data storing portion 162, and a computation processing unit 163.

The control processing unit 161 is configured to control the overall operation of the liquid chromatograph 100, and is provided with a control portion 161a, a measurement condition setting portion 161b which sets measurement conditions according to the operation of an operation panel (not shown), and a recording portion 161c which records a measurement result or the like.

The data storing portion 162 is configured to hold processed data or the like based on the measurement result.

The computation processing unit 163 is configured to perform processing based on the measurement result, and functions as a virtual curve calculation portion, a tentative feature point acquisition portion, an actual plot data feature point extraction portion, a baseline setting portion, and a quantitative processing portion. Specifically, the computation processing unit 163 includes, for example, a signal processing portion 163a which performs D/A conversion or the like of an analog signal output from the detector 150, a computing portion 163b which performs extraction and analysis of feature points, and a determination portion 163c which performs determination of an analysis result or the like.

(Data Processing Operation)

Figure 3:
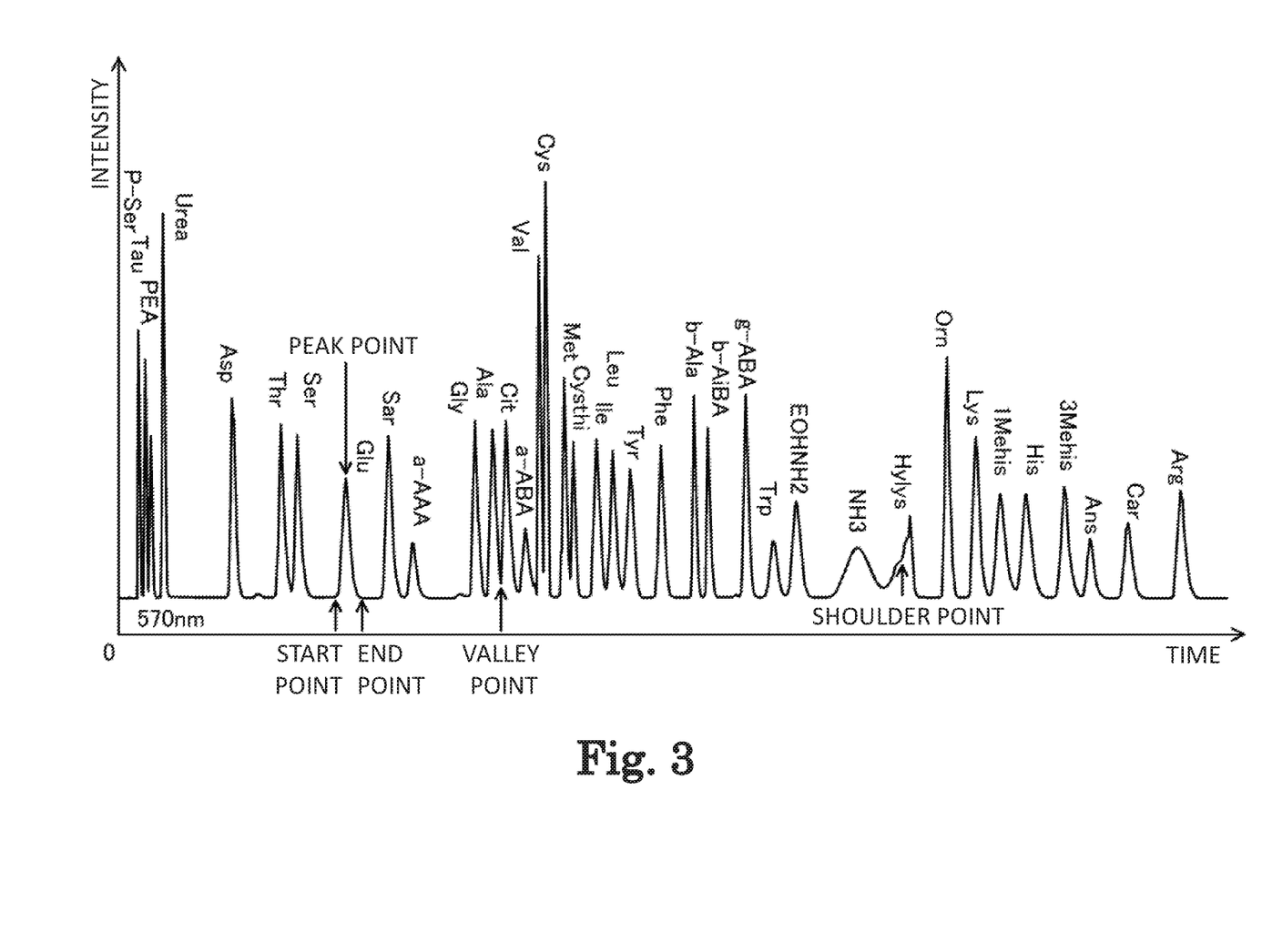
FIG. 3 is a diagram showing an example of a chromatogram.

In the liquid chromatograph 100, waveform data as shown in, for example, FIG. 3 can be obtained by a measurement operation. In the waveform data, the horizontal axis represents time and the vertical axis represents signal intensity. Since the relationship between the time and the component is known, the component contained in the analysis sample is specified by a retention time on the horizontal axis of the peak vertex of the waveform data (qualitative processing). In addition, based on the peak area of the waveform data, the amount of substance contained in the component is measured (quantitative calculation processing). In the processing, feature points such as a peak vertex, a start point, an end points, a valley point, and a shoulder point are extracted as shown in a typical example in FIG. 3, and baseline segments are set based on the feature points.

The extraction of the feature points is performed as described below and shown in FIGS. 4 to 6 by the processing of the computation processing unit 163, taking the extraction of the valley point as an example.

Figure 4:
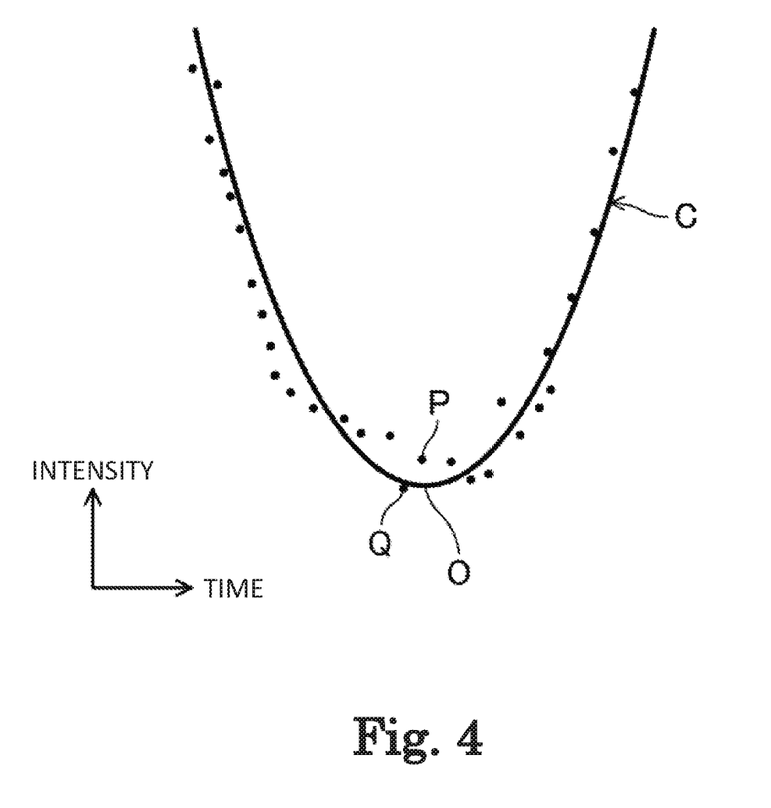
FIG. 4 is an explanatory diagram showing an extraction example of feature points.

That is, first, a virtual curve C such as a quadratic curve is obtained by a nonlinear least squares method based on the plot data which are discrete data actually detected by the detector 150 (FIG. 4). Alternatively, a hyperbolic cosine function (hyperbolic cosine: cosh) can also be used, but for any regression curve, a smaller number of regression coefficient is preferred because it is less likely to be influenced by noise and outliers. More specifically, for example, plot data of five adjacent points are applied to a quadratic function or a polynomial of third or higher order.

Figure 5:
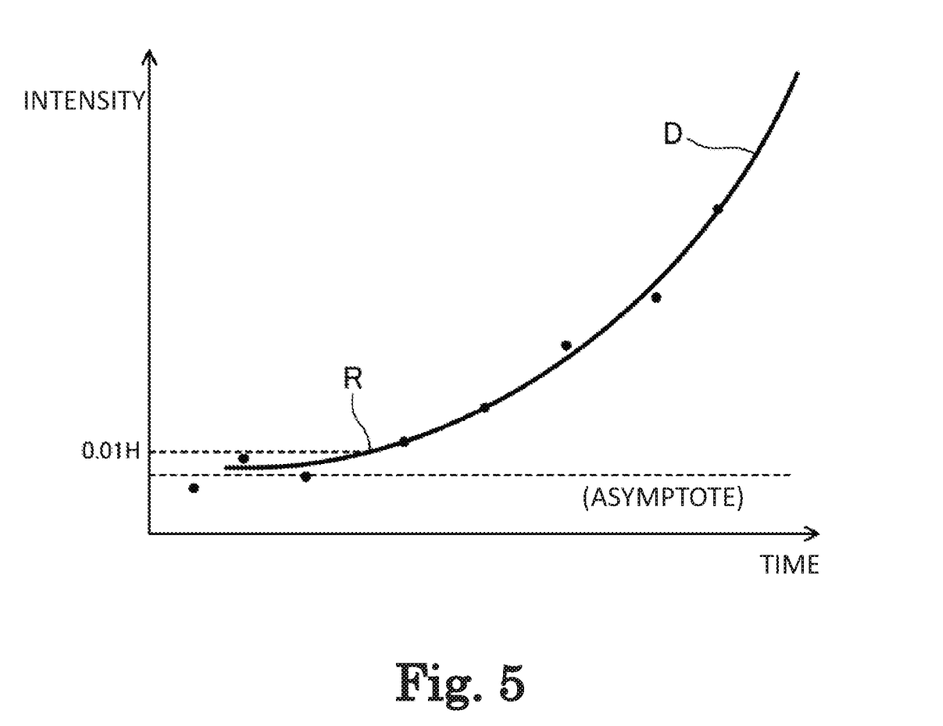
FIG. 5 is an explanatory diagram showing an extraction example of feature points.
Figure 6:
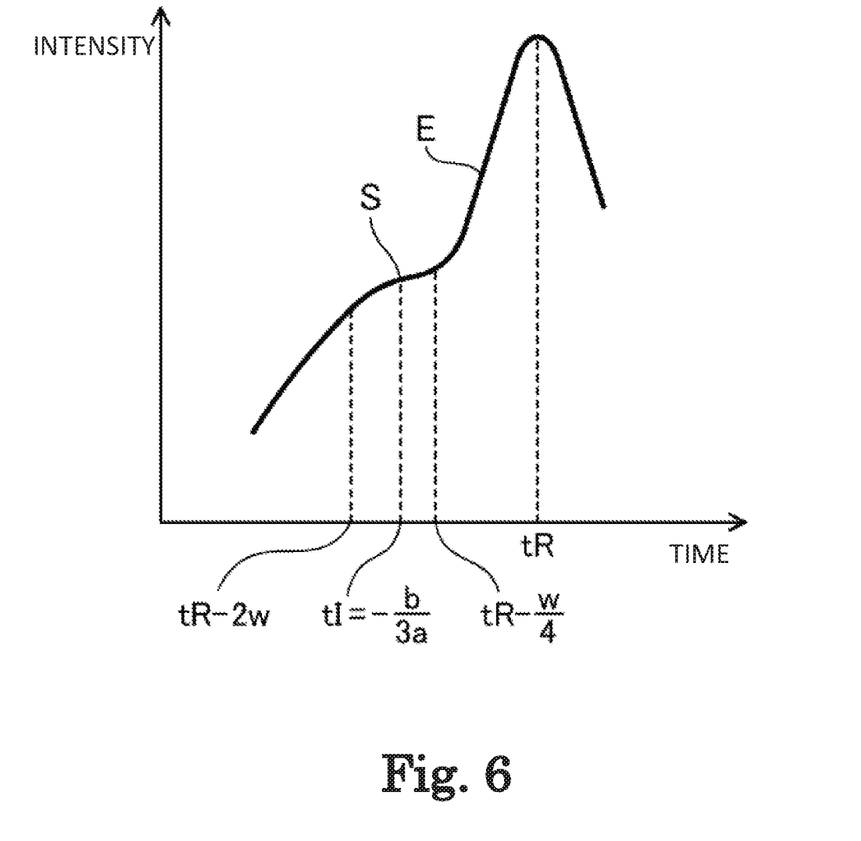
FIG. 6 is an explanatory diagram showing an extraction example of feature points.

In a case where a start point or an end point is to be obtained as the feature point, plot data of seven adjacent points are applied to a hyperbolic function (inverse proportional function) $f(t)=a/(t-b)+c$ (for example, D in FIG. 5). The regression function can be estimated with a polynomial of degree fourth or higher order, but as the number of the regression coefficient increases, it is more likely to be influenced by noise or the like, and the necessity of increasing the sum of actual data points to be regressed increases. Originally, the smaller the number of the regression coefficient is, the less likely it is influenced by outliers. The premise that the peak waveform which is a natural phenomenon should be a simple curve is the background of this regression. In addition, although a nonlinear function can be used as an exponential decay function, it is also possible to use Gaussian, EMG (Exponentially Modified Gaussian) or the like. Here, in a case where a plurality of peaks are adjacent to each other, for example, a feature length, a section, and a number in the time axis direction of the representative peak, such as a peak width w of an input full width at half maximum or the like, are set beforehand or later and the fitting is performed. That is, the number of actual data points to be regressed on the virtual curve is determined based on, for example, the input (given) peak width. In a case where the sampling interval of the plot data is small, for example, it may be appropriately bunched at a time corresponding to 15 to 30 points based on "w", or may be subjected to the smoothing processing of the actual measurement point group by the Savitzky-Golay method or the like.

More specifically, the peak width w is an input variable for the waveform processing given by a predetermined operation or input in a chromatographic data processing system (CDS). For example, in a case where it is input as 0.1 minute, the half-value full width of the target peak is the standard for calculating the data point interval with 0.1 minute as a criterion. For example, in a case where actual data are captured at a sampling interval of 50 msec, 0.1 minute equals to 6 sec=6,000 msec and the number of "w" is 120. In order to converge the 120 points to approximately 30 points, it is necessary to set the sampling interval to 200 msec, and as a result, four points can be collected into one data point, that is, the bunching processing can be performed. As can be seen, "w" is a very useful parameter. The bunching processing based on the input value w reduces the noise, and the CDS can assume the peak waveform intended by the operator as a preliminary step of the waveform processing. That is, it is not too much nor not too small due to the CDS, so that it can be optimized for the number of data points which can be easily processed.

In addition, an inflection point may be used as the feature point of the shoulder peak. In this case, the regression analysis can be performed to a polynomial of third or higher order or a hyperbolic sine function. The polynomial of third or higher order has no extreme value and has an inflection point (for example, S in FIG. 6, time coordinate value tI).

In many cases, the coordinate of the vertex O of the virtual curve C (FIG. 4) as described above can be relatively easily obtained by algebra operation or the like. Specifically, when a virtual curve is represented by, for example, a quadratic curve $f(t)=at^2+bt+c$, the time coordinate value of the vertex O is given as "$-b/2a$".

Alternatively, in the case of a virtual curve D (FIG. 5) of an inverse proportional function or the like, a tentative height of peak i is "H", "0.01H" obtained by being multiplied by a preset or later settable value 0.01 is used as a threshold, and a tentative start point (for example R in FIG. 5) and a tentative end point may be found to be at the left and right from the tentative baseline and tentative vertex.

When a virtual curve E (FIG. 6) is represented by a cubic curve $f(t)=at^3+bt^2+ct+d$, the time coordinate value tI of a shoulder point S is given as "$-b/3a$". In addition, it may be found that the variation of the adjacent data point is equal to or less than the threshold value. Here, in the regression analysis, using a discriminant of the quadratic function, it may be confirmed that there are no two real number solutions (monotonically increasing or monotonically decreasing), and the process of obtaining the tentative feature point may proceed. In a case where the real number solution is remarkably regressed with two, the general peak vertex detection processing may be performed. The regression may be performed under constraint conditions on coefficients a, b, c, and d, so as to be limited to a regression cubic expression of one real number solution. Even in a case of two real number solutions, when the time coordinate value of the inflection point as the shoulder point is highly likely to be appropriately determined, the tentative shoulder point may be obtained based on the inflection point even when the virtual curve does not necessarily match the most appropriate curve. In addition, the section setting of the regression analysis is designated by a term table for the waveform processing. When being performed automatically, the regression analysis may be performed by setting "tR−2w to tR−w/4" as a section using, for example, a tentative holding time tR and a peak half-value full width w of input. Here, the section "tR−2w to tR−w/4" needs to have flexibility, and it is particularly desirable that the section be set not to be influenced when adjacent peaks are close.

In addition, virtual feature points such as a start point, an end point, a valley point, a peak vertex, and a shoulder point may be obtained once using the Savitzky-Golay method for determining a differential coefficient of a regression curve. That is, the Savitzky-Golay method is also effective for calculating differential coefficients, and it is possible to determine not only the regression coefficient but also the differential coefficient of the polynomial. Thus, each virtual feature point may be obtained by using this differential coefficient.

The coordinate of the vertex O obtained as described above is usually the coordinate of an imaginary point. Thus, plot data feature points are extracted and selected from actually measured plot data with the feature points thus obtained based on the virtual curve C or the like as tentative feature points. Specifically, for example, plot data (e.g., plot data P) measured at a time closest to the tentative feature point, plot data which has the shortest distance from the tentative feature point, plot data (e.g., plot data Q) which has an extreme value within a predetermined time range from the tentative feature point, or a point with the smallest slope between adjacent plot data is extracted and selected as the actual plot data feature points.

That is, actual data points and various virtual feature points can be connected based on certain rules such as selecting plot data measured at a time closer from the tentative feature point. This method is the outline of the present disclosure, but besides the rule of selecting the closer plot data between two time points, and it may be considered to select plot data measured at a time earlier than the tentative feature point or plot data measured at a time later than the tentative feature point. Further, a rule considering information on the vertical axis direction (detected intensity) of a two-dimensional chromatogram is also conceivable.

Since the plot data feature point obtained as described above is highly likely to be a feature point or a point closest to the feature point among the actually measured plot data, it is expected to obtain coordinate values of appropriate feature points. In addition, compared with the tentative feature point based on the virtual curve, it is less likely to be influenced by other plot data such as separated plot data. Therefore, the detection accuracy can be easily improved by performing the qualitative processing using the plot data feature points, setting the baseline, and further performing the quantitative processing. In addition, even in the case where a blank sample is not prepared, the quantitative processing or the like can be performed with a line segment connecting the plot data feature points as the baseline. Further, even in the case of blank data, when the influence of noise on the blank data is large, more accurate processing can be performed by using the plot data feature points. Furthermore, even when a blank sample is used and even when the valley point does not decrease to the baseline, more accurate processing can be performed.

(Others)

In the above embodiment, the liquid chromatograph is described as an example, but the present disclosure is not limited thereto, and similar processing can be applied to various chromatographs.

The method using the tentative feature points and the plot data feature points as described above does not exclude a general method of directly obtaining a feature point based on a virtual curve, but it is also possible to selectively use those methods and the method of the present disclosure. Further, analysis results by such various methods may be displayed in a comparable manner.

Here, the difference between "time point" and "time" is explained. "time point" represents each moment of time in a progressing clock. An original point, i.e., time point zero can be set as one of time points. For example, 16:10:10 on Apr. 1, 2020 is a time point. On the other hand, "time" represents the length of time, which is 10 seconds, 1.2 minutes, and is a difference, i.e., a period, between a time point A and a time point B. The retention time also belongs to the time.

LIST OF NUMERAL REFERENCES

100 Liquid chromatograph
110 Mobile phase container
120 Pump
130 Autosampler
140 Column
141 Column oven
150 Detector
160 Chromatographic data system processing apparatus (Data processing apparatus)
161 Control processing unit
161a Control portion
161b Measurement condition setting portion
161c Recording portion
162 Data storing portion
163 Computation processing unit
163a Signal processing portion
163b Computing portion
163c Determination portion
170 Display

What is claimed is:

1. A liquid chromatograph, comprising:
a container configured to store a liquid as a mobile phase;
a pump for feeding the mobile phase from the container;
an autosampler, which receives the fed mobile phase, and injects a sample;
a column to separate components in the sample;
a detector, which detects and measures a separated component, and generates measured plot data;
a display; and
a chromatographic data system processing apparatus that performs data processing based on the measured plot data, the data system processing apparatus comprising:

a memory for storing the measured plot data;
a processing unit configured to:
  obtain a virtual curve, which is a regression curve, based on the measured plot data stored in the memory;
  obtain a tentative feature point based on the obtained virtual curve; and
  extract an actual plot data feature point corresponding to the tentative feature point from the measured plot data; and
  outputting to the display the actual plot data feature point to indicate composition of the liquid.

2. The liquid chromatograph according to claim 1, wherein to extract the actual plot data feature point extracts, from the measured plot data, at least one of plot data measured at a time closest to the tentative feature point, plot data measured at a time earlier than the tentative feature point and closest to the tentative feature point, plot data measured at a time later than the tentative feature point and closest to the tentative feature point, plot data which has a shortest distance from the tentative feature point, and plot data which has an extreme value within a predetermined time range from the tentative feature point.

3. The liquid chromatograph according to claim 1, wherein the actual plot data feature point is at least one of a start point, an end point, a peak vertex, a valley point, and a shoulder point.

4. The liquid chromatograph according to claim 3, wherein to obtain the tentative feature point comprises:
  processing for using a hyperbolic function, an exponential decay function, or a polynomial of fourth or higher order to obtain at least one of the start point and the end point;
  processing for using a polynomial of second or higher order or a hyperbolic cosine function to obtain at least one of the valley point and the peak vertex; and
  processing for using a polynomial of third or higher order or a hyperbolic sine function to obtain an inflection point of a shoulder peak.

5. The liquid chromatograph according to claim 4, wherein to obtain the tentative feature point comprises obtaining at least one of a tentative start point and a tentative end point, based on the virtual curve and a predetermined threshold value set based on a tentatively obtained peak height.

6. The liquid chromatograph according to claim 1, wherein the processing unit is further configured to:
  set a baseline based on the actual plot data feature point; and
  perform quantitative processing of a measurement sample based on the baseline, and the plot data or the virtual curve.

7. The liquid chromatograph according to claim 6, wherein to set the baseline comprises setting a line segment connecting two actual plot data feature points as the baseline.

8. The liquid chromatograph according to claim 1, wherein the virtual curve is obtained by regression and a number of actual data points to be regressed on the virtual curve is determined based on a given peak width.

9. A chromatographic data system processing method that performs data processing based on plot data measured by a chromatograph, the chromatograph comprising: a container configured to store a liquid as a mobile phase; a pump for feeding the mobile phase from the container; an autosampler, which receives the fed mobile phase, and injects a sample; a column to separate components in the sample; a detector, which detects and measures a separated component and generates measured plot data; and a display, the method comprising the steps of:
  obtaining a virtual curve, which is a regression curve, based on the measured plot data stored in a memory;
  obtaining a tentative feature point based on the obtained virtual curve;
  extracting an actual plot data feature point corresponding to the tentative feature point from the measured plot data; and
  outputting to the display the actual plot data feature point to indicate composition of the liquid.

* * * * *